Patented May 6, 1952

2,595,890

UNITED STATES PATENT OFFICE 2,595,890

LINEAR METHYL SILOXANES HAVING HYDROGEN DIRECTLY LINKED TO SILICON

Robert O. Sauer, Schenectady, N. Y., assignor to General Electric Company, a corporation of New York No Drawing. Application March 21, 1946, Serial No. 656,163

13 Claims. (Cl. 260—448.2)

This invention relates to new and useful chemical compounds, and more particularly is concerned with compounds known as polysiloxanes. Specifically the invention relates to new linear polysiloxanes corresponding to the general formula I 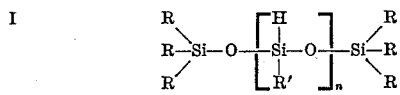

where each R represents a monovalent hydrocarbon radical, e. g., an alkyl, aryl, aralkyl, alkaryl, etc., radical, the foregoing radicals being examples of monovalent hydrocarbon radicals free of olefinic unsaturation, R' represents a lower alkyl radical, and $n$ represents an integer which is at least 1 and not more than 4.

The scope of the invention also includes method features, more particularly the method which comprises (1) mixing together (A) a disiloxane corresponding to the general formula II 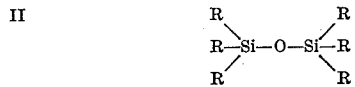

where R has the same meaning as given above with reference to Formula I, and (B) an oily product of hydrolysis of a halogenosilane corresponding to the general formula III     R'SiHX$_2$ where R' represents a lower alkyl radical and X represents a halogen selected from the class consisting of chlorine and bromine, (2) cleaving siloxane linkages of the ingredients of (A) and (B), (3) forming silanol derivatives of the cleaved compounds, (4) effecting a condensation reaction between the said silanol derivatives, the steps of (2), (3) and (4) being carried out substantially concomitantly or simultaneously, that is, more or less conjointly while the reactants of (A) and (B) are admixed, and (5) separating from the resulting reaction mass at least one linear polysiloxane corresponding to Formula I.

Illustrative examples of monovalent hydrocarbon radicals which R in Formulas I and II may represent are: aliphatic (e. g., methyl, ethyl, propyl, butyl, pentyl, hexyl, heptyl, octyl, nonyl, decyl, etc.), including cycloaliphatic (e. g., cyclopentyl, cyclohexyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, butylphenyl, etc.); aryl-substituted aliphatic (e. g., benzyl, phenylethyl, phenylpropyl, phenylisopropyl, etc.); and other (including higher) homologues thereof. Illustrative examples of lower alkyl radicals which R' in Formulas I and III, as well as R in Formulas I and II, may represent are: methyl, ethyl, propyl, isopropyl, n-butyl, isobutyl, sec.-butyl, etc.

Examples of compounds embraced by Formula I that may be produced in accordance with the present invention are the heptaälkyltrisiloxanes, e. g., heptamethyltrisiloxane, heptaethyltrisiloxane, hepta-n-propyltrisiloxane, etc.; octaälkyltetrasiloxanes, e. g., octamethyltetrasiloxane, octaethyltetrasiloxane, octaisopropyltetrasiloxane, etc.; nonaälkylpentasiloxanes, e. g., nonamethylpentasiloxane, nonaethylpentasiloxane, nona-n-butylpentasiloxane, etc.; decaälkylhexasiloxanes, e. g., decamethylhexasiloxane, decaethylhexasiloxane, deca-n-propylhexasiloxane, decaisobutylhexasiloxane, etc.; hexaäryl-2-(lower alkyl)-trisiloxanes, e. g., hexaphenyl-2-methyltrisiloxane, etc.; hexa-(aliphatic-substituted aryl)-2-(lower alkyl)-trisiloxanes, e. g., hexatolyl-2-ethyltrisiloxane, etc.; hexa-(aryl-substituted aliphatic)-2-(lower alkyl)-trisiloxanes, e. g., hexabenzyl-2-n-propyltrisiloxanes, etc.; 3,5-di-(lower alkyl) - 1,1,1,7,7,7 - hexaäryltetrasiloxane, e. g., 3,5-dimethyl-1,1,1,7,7,7-hexaphenyltetrasiloxane, etc.; and homologues thereof embraced by the aforegiven Formula I.

It was known prior to my invention that there could be produced linear polysiloxanes corresponding to the general formula IV 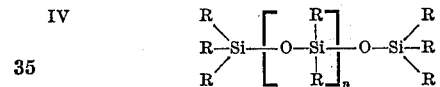

in which the various R's represent the same or different lower, monovalent hydrocarbon radicals, more particularly hydrocarbon radicals selected from the class consisting of lower alkyl, aryl, alkaryl, and aralkyl radicals, and $n$ is an integer equal to at least 1. Examples of such linear polysiloxanes are octamethyltrisiloxane, decamethyltetrasiloxane, dodecamethylpentasiloxane, tetradecamethylhexasiloxane, octaphenyltrisiloxane, etc. Such linear polysiloxanes and methods of preparation are more fully described and are specifically claimed in the copending application of Winton I. Patnode, Serial No. 463,814, filed October 29, 1942, now U. S. Patent 2,469,888, and assigned to the same assignee as the present invention. The compounds of the instant invention differ from the class of compounds disclosed by Patnode in the aforementioned application in that, instead of two monovalent hydrocarbon radicals being attached directly to each Si atom intermediate the terminal Si atoms of the chain, there are attached to each such Si atom one lower alkyl group, e. g., a methyl group, and one hydrogen atom.

A consideration of the chemistry of the hydrogen atoms bonded to silicon atoms in the compounds of my invention will make more clearly understood the material differences between them and those described in the aforementioned Patnode application. With appropriate alkaline reagents the silicon-hydrogen bonds of the compounds embraced by Formula I undergo hydrolytic cleavage to yield silanols, which subsequently may be dehydrated to form polysiloxanes. In marked contrast, the corresponding compounds embraced by Formula IV do not increase in oxygen-to-silicon ratio under these conditions. It is known, however, that certain related substances, for example, polymeric phenyl methyl silicones (phenyl methyl polysiloxanes) are hydrolytically degraded in the presence of aqueous hydrochloric acid to give benzene [Hyde and De Long, J. Amer. Chem. Soc., 63, 1194 (1941)]. Although hydrolysis of the silicon-hydrogen bonds in the group of compounds embraced by Formula I does occur under alkaline conditions, these bonds are substantially stable toward cold non-oxidizing acids, such as the hydrochloric acid produced by hydroylsis of the chlorosilanes or the sulfuric acid used in equilibration processes. Nitric acid at room temperature is reduced by my new compounds.

Some of the linear polysiloxanes of this invention and polymers thereof are useful as components of oily materials or lubricants of the kind disclosed and claimed in the copending application of Donald F. Wilcock, Serial No. 656,162, filed concurrently herewith and assigned to the same assignee as the present invention. All of them are especially valuable as intermediates in the preparation of other organo-silicon compounds. In this connection it may be noted that, although the silicon-hydrogen bonds of my new compounds are affected by alkaline reagents, the Si—H bonds of different compounds appear to show different degrees of reactivity. Thus, whereas hydrogen is not displaced hydrolytically from the compound represented by the formula $(CH_3)_3SiOSiH(CH_3)OSi(CH_3)_3$ by concentrated aqueous potassium hydroxide even when warmed to above 60° C., concentrated ammonium hydroxide, a much weaker base, displaces hydrogen from the next higher homolog (octamethyltetrasiloxane). The varying degrees of reactivity of the Si—H bonds in these new linear polysiloxanes, which was quite surprising and in no way could have been predicted, may have practical application in using these compounds as intermediates in synthesizing other organo-silicon compounds.

The linear polysiloxanes with which this invention is concerned may be prepared in various ways. One suitable method is broadly described in the first paragraph of this specification. In practicing the method therein set forth I may use any modifying agent and conditions of reaction that will result in cleaving the siloxane linkages of the disiloxane of Formula II and of the oily product of hydrolysis of a halogenosilane corresponding to Formula III, in forming silanol derivatives of the cleaved compounds, and in causing condensation between the silanol derivatives, which steps advantageously all take place at substantially the same time. I have found that sulfuric acid is a suitable agent for use in effecting these simultaneous or almost simultaneous reactions. The sulfuric acid may be of any suitable concentration, for instance aqueous solutions containing, by weight, from 70 to 95% or more $H_2SO_4$. The usual grades of concentrated sulfuric acid (e. g., acid containing about 90 to 98% by weight $H_2SO_4$) are satisfactory.

The amount of modifying agent or catalyst may be varied as desired or as conditions may require. When concentrated sulfuric acid, for example, is used the acid may be employed in an amount corresponding to, for instance, from about 1 to 10% by volume of the mixed disiloxane and oily hydrolyzate.

The mixed ingredients, or one or the other prior to admixture, or the halogenosilane (which subsequently is hydrolyzed to obtain the oily hydrolyzate) alone or admixed with the disiloxane, may be dissolved in a suitable organic solvent which is substantially inert to the action of sulfuric acid, more particularly concentrated sulfuric acid. Examples of suitable solvents are the normally liquid paraffin hydrocarbons, e. g., hexanes, heptanes, octanes, mixtures of the normal and isomeric forms of these hydrocarbons, mixtures of hexanes and heptanes, of hexanes, heptanes and octanes, etc. Reaction then is effected between the disiloxane and the oily hydrolyzate in solution state. Instead of using the entire product of hydrolysis of the dihalogenosilane, I may employ a previously isolated cyclopolysiloxane corresponding to the general formula $(R'SiHO)_n$, where R' has the meaning above given, e. g., one represented by the formula $(CH_3SiHO)_n$, where $n$ (both formulas) is an integer which is at least 4 and not more than 6, or mixtures thereof, or oily hydrolyzates containing any or all of these cyclopolysiloxanes. Examples of such cyclopolysiloxanes, which more fully are described and specifically are claimed in my copending application Serial No. 656,164, are 1,3,5,7-tetramethylcyclotetrasiloxane, 1,3,5,7,-9-pentamethylcyclopentasiloxane, 1,3,5,7,9,11-hexamethylcyclohexasiloxane, and the corresponding ethyl, propyl, isopropyl, butyl and other lower alkyl derivatives.

From the foregoing description it will be seen that a specific method feature of my invention comprises contacting with sulfuric acid of concentrated or other suitable strength a mixture containing (1) a disiloxane corresponding to Formula II, e. g., hexamethyldisiloxane, and (2) an oily product of hydrolysis of a hologenosilane corresponding to Formula III, e. g., methyldichlorosilane, or a cyclopolysiloxane of the kind mentioned in the preceding paragraph, or mixtures thereof or oily hydrolyzates containing the same, thereby to effect reaction between the ingredients of (1) and (2). A relatively low temperature of reaction is preferred, e. g., from 0 to 30° C. I then separate from the resulting reaction product, e. g., by distillation of the said product after removing the excess acid (as by washing with water), at least one linear polysiloxane corresponding to Formula I. Thus, depending upon the particular reactants of (1) and (2) employed, I may separate from the reaction mass one or more linear polysiloxanes corresponding to the general formula V 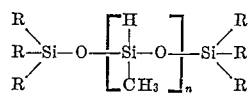

where R and $n$ have the same meanings given above with reference to Formula I, specifically a linear polysiloxane represented by the following formula:

VI 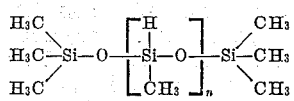

where $n$ is 1, 2, 3 or 4.

Illustrative examples of disiloxanes that may be used in practicing the above-described method feature of my invention are hexamethyldisiloxane, hexaethyldisiloxane, hexaphenyldisiloxane, 1,1,1 - trimethyl-3,3,3-triethyldisiloxane, hexabenzyldisiloxane, 1,3-dimethyl-1,3-diethyl-1,3-dipropyldisiloxane, etc. A general method of preparing the disiloxane reactant comprises replacing three of the four chlorine atoms in silicon tetrachloride by monovalent hydrocarbon radicals, e. g., alkyl, aryl, alkaryl, aralykyl, etc., radicals, for instance, by employing the appropriate Grignard reagent to obtain the groupings desired about each silicon atom in the final disiloxane. The tri-(monovalent hydrocarbon) monochlorosilane that results may then be hydrolyzed and condensed to the desired disiloxane. If an unsymmetrically-substituted disiloxane is sought, it may be obtained by carrying out the above process stepwise, using in each step the appropriate Grignard reagent.

The halogenosilanes of Formula III, which are hydrolyzed to form an oily hydrolyzate that may be reacted with the disiloxane, may be produced, for example, by the interaction of a lower alkyl magnesium halide, e. g., ethyl magnesium chloride, propyl magnesium bromide, etc., with trichlorosilane, $HSiCl_3$, or tribromosilane, $HSiBr_3$. In these reactions approximately one mole of the appropriate Grignard reagent dissolved in ether is used for each mole of the trihalogenosilane, and the Grignard solution is added slowly to the trihalogenosilane. Examples of halogenosilanes that may be prepared in this way are the methyl, ethyl, propyl, isopropyl, n-butyl, isobutyl, sec.-butyl, etc., dichloro and dibromo silanes ($RSiHCl_2$ and $RSiHBr_2$).

The halogenosilane may be separately hydrolyzed as described in my aforementioned copending application Serial No. 656,164, filed concurrently herewith and assigned to the same assignee as the present invention; or it may be hydrolyzed while admixed with the disiloxane reactant.

Another method by which the linear polysiloxanes of Formula I may be prepared comprises hydrolyzing a mixture or organohalogenosilanes, one member of which is represented by the formula VII 

and the other member of which is represented by the formula

VIII $\quad R'SiHX_2$ where R, R' and X have the same meanings as given above with reference to Formulas I and III. The mixture is hydrolyzed and the product of co-hydrolysis separated from the aqueous halogen acid, washed free of excess acid, etc., in a manner similar to that described in, for example, my application Serial No. 656,164 with particular reference to the hydrolysis of the halogenosilane of Formula VIII alone. The resulting co-hydrolyzate then may be suitably treated, e. g., by agitating sulfuric acid therewith, washed with water to remove excess sulfuric acid, and then distilled first at atmospheric pressure and subsequently at reduced pressure to isolate linear polysiloxanes of the kind embraced by Formula I.

Still another method by which the linear polysiloxanes of Formula I may be prepared comprises bringing a mixture of the halogenosilanes of Formulas VII and VIII into intimate contact with concentrated hydrochloric acid (35–37% by weight HCl) as more fully described under Examples 2 and 3 of the aforementioned copending application of Donald F. Wilcock, Serial No. 656,162, now U. S. Patent 2,491,843, issued December 20, 1949, with particular reference to the preparation of a lubricant by treating a mixture of methyldichlorosilane and trimethylchlorosilane with concentrated hydrochloric acid. The oily phase is freed of excess hydrochloric acid, as by washing with water, and then distilled as above described to isolate the linear polysiloxanes of this invention.

In order that those skilled in the art better may understand how the present invention may be carried into effect, the following example is given by way of illustration and not by way of limitation.

EXAMPLE

A slurry of ice in a solution of 4625 g. (28.6 moles) of hexamethyldisiloxane and 1400 g. of mixed hexanes was prepared in a 10-gallon crock. A propeller-type stirrer was arranged to agitate vigorously the contents of the crock. Two kilograms (17.4 moles) of methyldichlorosilane was added slowly to the vortex formed by the stirrer. The ice was continually replenished, and the addition of the chlorosilane was interrupted whenever it became necessary to siphon out some of the water layer to avoid overflow. When the addition was complete, the oily layer was separated, washed with water, and filtered to remove emulsified water.

The oil was then stirred vigorously with 360 ml. of concentrated sulfuric acid (approximately 95% by weight $H_2SO_4$) for two hours at room temperature. The acid layer was separated and discarded; a slight odor of sulfur dioxide was noted. The organic phase resulting from the sulfuric acid treatment was washed three times with half its volume of water to remove excess acid and then was distilled at atmospheric pressure, using a column having about fifteen theoretical plates. Careful fractionation yielded:

| | Grams |
|---|---|
| Hexanes | 1,235 |
| Hexamethyldisiloxane | 2,370 |
| Heptamethyltrisiloxane (embraced by Formula I, B. P. 142° C. at 760 mm.) | 1,390 |
| Octamethyltetrasiloxane (embraced by Formula I, B. P. 177° C. at 760 mm.) | 328 |
| Residue | 1,115 |

Distillation was stopped before all of the octamethyltetrasiloxane had been separated from the oily reaction mass.

The hexamethyldisiloxane and the residue from the above distillation were combined and the mixture treated with concentrated sulfuric acid, washed, etc., as before. Fractionation of the resulting "equilibration" product gave more hexamethyldisiloxane, heptamethyltrisiloxane and octamethyltetrasiloxane. In addition, the following materials were isolated: heptamethyl-3-trimethylsiloxytrisiloxane, B. P. 183.6–190.6° C. (760 mm.), $n_D^{20}$ 1.3872, $d_4^{20}$ 0.8533, 31 mls.; nonamethylpentasiloxane, B. P. 85.6° C. (10 mm.), 101 mls.; and decamethylhexasiloxane, B. P. 106.5–107.6° C. (10 mm.), 21 mls. Some additional substances were separated in an impure state. Although not identified, they probably contained $CH_3SiO_{3/2}$ units as the result of either hydrolytic or oxidative attack on $CH_3SiHO$ units by the concentrated sulfuric acid used to rearrange the siloxane linkages. The physical constants (other than boiling points) and the analytical data on the purified samples of heptamethyltrisiloxane (compound No. 1), octamethyltetrasiloxane (compound No. 2), nonamethylpentasiloxane (compound No. 3) and decamethylhexasiloxane (compound No. 4) are given in the following table:

Table

| Compound No. | $n_D^{20}$ | $d_4^{20}$ (vac.) | Percent H(—Si) | | Percent C | | Percent H | |
|---|---|---|---|---|---|---|---|---|
| | | | Calcd. | Found | Calcd. | Found | Calcd. | Found |
| 1 | 1.3818 | 0.8194 | 0.45 | 0.46, 0.46 | 37.80 | 37.4, 37.8 | 9.97 | 10.1, 9.7 |
| 2 | 1.3854 | 0.8559 | 0.71 | 0.70 | 34.01 | 33.5, 33.7 | 9.27 | 9.2, 9.2 |
| 3 | 1.3878 | 0.8806 | 0.88 | 0.88, 0.90 | 31.55 | 31.8, 31.6 | 8.82 | 8.9, 8.8 |
| 4¹ | 1.3895 | 0.8991 | 1.00 | 0.94, 0.96 | 29.82 | 29.7, 29.6 | 8.51 | 8.5, 8.4 |

¹NOTE: This sample of decamethylhexasiloxane was not quite so pure as the other eamples of linear polysiloxanes which were isolated and examined.

From the foregoing description it will be seen that the present invention provides new and useful linear polysiloxanes corresponding to Formula I, as well as methods of preparing such polysiloxanes. Specific method features of the invention include the method which comprises effecting reaction, in the presence of sulfuric acid, e. g., sulfuric acid comprising, by weight, 70 to 98% $H_2SO_4$ (including concentrated sulfuric acid of 90 to 98% acid concentration) between (1) a disiloxane corresponding to Formula II (in which formula R may represent, for example, a lower alkyl or other alkyl radical, an aryl radical, etc.), specifically hexamethyldisiloxane, and (2) an oily product of hydrolysis of a halogenosilane corresponding to Formula III, more particularly the oily product of hydrolysis of methyldichlorosilane, separating the oily material resulting from the reaction from the acid phase, removing excess acid from said oily material, as by washing with water, neutralizing with an alkaline material, etc., and separating from the washed oily material, e. g., by distillation at atmospheric or reduced pressure, as may be required, linear polysiloxanes corresponding to Formula I, or any or all of such polysiloxanes, e. g., linear polysiloxanes corresponding to Formula VI when the starting reactants are hexamethyldisiloxane and an oily product of hydrolysis of methyldichlorosilane or one or more previously isolated cyclopolysiloxanes present in such oily hydrolysis product.

Another specific method feature of the invention comprises bringing into intimate contact, as by agitation, (1) sulfuric acid, more particularly concentrated sulfuric acid, and (2) a solution containing (A) a disiloxane of the kind embraced by Formula II, specifically hexamethyldisiloxane, (B) an oily hydrolyzate containing cyclopolysiloxanes corresponding to the general formula $(R'SiHO)_n$, where R' has the meaning above given, e. g., one represented by the formula $(CH_3SiHO)_n$, where n (both formulas) is an integer which is at least 4 and not more than 6, and (C) an organic solvent for (A) and (B) which is substantially inert to the action of the sulfuric acid of (1), e. g., a mixture of hexanes, thereby to effect reaction between the ingredients of (A) and (B), separating the acid phase from the organic phase at the end of the reaction period, washing the organic phase with water to remove excess acid, and distilling the washed organic phase to remove the organic solvent and to obtain at least one linear polysiloxane corresponding to Formula I, more particularly a linear polysiloxane corresponding to Formula VI.

Illustrative examples of compounds embraced by Formula I, other than those hereinbeforementioned, that may be produced in accordance with the present invention are:

Heptaisopropyltrisiloxane
Hepta-n-butyltrisiloxane
Heptaisobutyltrisiloxane
Hepta-sec.-butyltrisiloxane
Hexapropyl-2-methyltrisiloxane
3,5-diethyl-1,1,1,7,7,7-hexadecyltetrasiloxane
Hexaheptyl-2-propyltrisiloxane
3,5-di-n-butyl-1,1,1,7,7,7-hexoctyltetrasiloxane
Octa-n-propyltetrasiloxane
Octa-n-butyltetrasiloxane
Octaisobutyltetrasiloxane
Octa-sec.-butyltetrasiloxane
Nonapropylpentasiloxane
Nonaisopropylpentasiloxane
Nonaisobutylpentasiloxane
Nona-sec.-butylpentasiloxane
Decaisopropylhexasiloxane
Deca-n-butylhexasiloxane
Deca-sec.-butylhexasiloxane
Hexaoctyl-2-isobutyltrisiloxane
Hexaphenyl-2-ethyltrisiloxane
Hexatolyl-2-methyltrisiloxane
Hexabenzyl-2-methyltrisiloxane
Hexa-(phenylethyl)-2-ethyltrisiloxane
3,5-diethyl-1,1,1,7,7,7-hexatolyltetrasiloxane
3,5-dimethyl-1,1,1,7,7,7-hexabenzyltetrasiloxane
3,5-dibutyl-1,1,1,7,7,7-hexaphenyltetrasiloxane
Hexacyclopentyl-2-methyltrisiloxane
3,5,7 - trimethyl - 1,1,1,9,9,9-hexaethylpentasiloxane
3,5,7-triethyl - 1,1,1,9,9,9 - hexadecylpentasiloxane
3,5,7 - trimethyl - 1,1,1,9,9,9-hexaphenylpentasiloxane
3,5,7 - tripropyl-1,1,1,9,9,9-hexatolylpentasiloxane
3,5,7 - tri-n-butyl-1,1,1,9,9,9-hexabenzylpentasiloxane
3,5,7 - trimethyl - 1,1,1,9,9,9 - hexacyclopentylpentasiloxane
3,5,7,9 - tetramethyl - 1,1,1,11,11,11 - hexapropylhexasiloxane
3,5,7,9 - tetraethyl - 1,1,1,11,11,11 - hexanonylhexasiloxane
3,5,7,9 - tetraisopropyl - 1,1,1,11,11,11 - hexacyclohexylhexasiloxane
3,5,7,9 - tetramethyl - 1,1,1,11,11,11 - hexaphenylhexasiloxane
3,5,7,9 - tetraethyl - 1,1,1,11,11,11 - hexaphenylhexasiloxane 3,5,7,9 - tetra - n-butyl-1,1,1,11,11,11-hexatolyl-hexasiloxane 3,5,7,9 - tetramethyl - 1,1,1,11,11,11 - hexaxylyl-hexasiloxane 3,5,7,9 - tetraethyl - 1,1,1,11,11,11 - hexabenzyl-hexasiloxane

What I claim as new and desire to secure by Letters Patent of the United States is:

1. A linear polysiloxane corresponding to the general formula

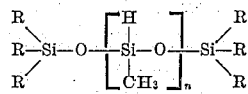

where each R represents a monovalent hydrocarbon radical selected from the class consisting of alkyl and aryl radicals, and $n$ represents an integer which is at least 1 and not more than 4.

2. Heptamethyltrisiloxane.
3. Octamethyltetrasiloxane.
4. Nonamethylpentasiloxane.
5. A linear polysiloxane corresponding to the general formula

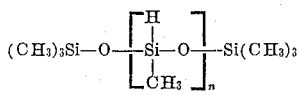

where $n$ represents an integer which is at least 1 and not more than 4.

6. Decamethylhexasiloxane.

7. The method which comprises contacting with sulfuric acid at a temperature below 30° C. a mixture containing (1) a disiloxane corresponding to the general formula

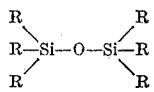

where each R represents a monovalent hydrocarbon radical free of olefinic unsaturation and (2) an oily product containing cyclopolysiloxanes corresponding to the general formula (R'SiHO)$_n$, where R' represents a lower alkyl radical and $n$ is an integer which is at least 4 and not more than 6, the said oily product being essentially an organopolysiloxane consisting essentially of the repeating polymeric unit R'$_2$SiHO where R' has the meaning given above, and separating from the resulting reaction product at least one linear polysiloxane corresponding to the general formula

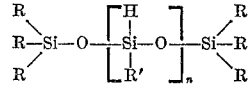

where R and R' have the meanings above given and $n$ represents an integer which is at least 1 and not more than 4.

8. A method as in claim 7 wherein each R represents an alkyl radical.

9. A method as in claim 7 wherein each R represents an alkyl radical and R' represents a methyl radical.

10. The method which comprises bringing concentrated sulfuric acid into intimate contact with a mixture of (1) a disiloxane corresponding to the general formula

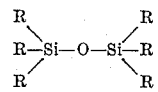

where each R represents a monovalent hydrocarbon radical free of olefinic unsaturation and (2) an oily product of hydrolysis of methyldichlorosilane at a temperature of from 0° to 30° C. thereby to effect reaction between the ingredients of (1) and (2), removing excess acid from the resulting reaction product, and isolating from the said product at least one linear polysiloxane corresponding to the general formula

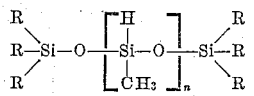

where each R represents a monovalent hydrocarbon radical free of olefinic unsaturation, and $n$ represents an integer which is at least 1 and not more than 4.

11. The method which comprises effecting reaction, in the presence of sulfuric acid and at a temperature of from 0° to 30° C., between (1) a disiloxane corresponding to the general formula

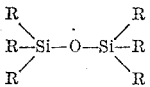

where each R represents a lower alkyl radical and (2) an oily product containing cyclopolysiloxanes corresponding to the general formula (R'SiHO)$_n$, where R' represents a lower alkyl radical and $n$ is an integer which is at least 4 and not more than 6, the said oily product being essentially an organopolysiloxane consisting essentially of the repeating polymeric unit R'SiHO where R' has the meaning given above, separating the oily material resulting from the reaction from the acid phase, washing said oily material with water to remove excess acid, and separating from the washed oily material by distillation linear polysiloxanes corresponding to the general formula

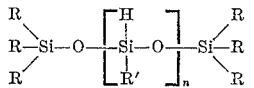

where R and R' have the meanings above given, and $n$ represents an integer which is at least 1 and not more than 4.

12. The method which comprises effecting reaction, in the presence of sulfuric acid and at a temperature of from 0° to 30° C. between (1) hexamethyldisiloxane and (2) the oily product of hydroysis of methyldichlorosilane, separating the acid phase from the oily product of reaction of (1) and (2), washing the said oily reaction product with water to remove excess acid, and distilling the washed product to separate therefrom at least one linear polysiloxane corresponding to the general formula

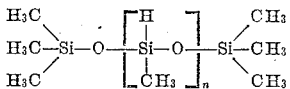

where $n$ represents an integer which is at least 1 and not more than 4.

13. The method which comprises bringing into intimate contact at a temperature of from 0° to 30° C. (1) concentrated sulfuric acid and (2) a solution containing (A) hexamethyldisiloxane, (B) an oily hydrolyzate containing cyclopolysiloxanes corresponding to the general formula (CH$_3$SiHO)$_n$, where $n$ represents an integer which is at least 4 and not more than 6, the said oily hydroyzate being a methylpolysiloxane consisting essentially of the recurring polymeric unit CH$_3$SiHO, and (C) an organic solvent for (A) and (B) which is substantially inert to the action of concentrated sulfuric acid, thereby to effect reaction between the ingredients of (A) and (B), separating the acid phase from the organic phase at the end of the reaction period, washing the organic phase with water to remove excess acid, and distilling the washed organic phase to remove the organic solvent and to obtain at least one linear polysiloxane corresponding to the general formula

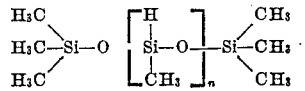

where $n$ represents an integer which is at least 1 and not more than 4.

ROBERT O. SAUER.

REFERENCES CITED

The following references are of record in the file of this patent:

UNITED STATES PATENTS

| Number | Name | Date |
| --- | --- | --- |
| 2,265,962 | Bent et al. | Dec. 9, 1941 |
| 2,306,222 | Patnode | Dec. 22, 1942 |
| 2,383,521 | Sowa | Aug. 28, 1945 |
| 2,386,259 | Norton et al. | Oct. 9, 1945 |
| 2,386,441 | Daudt | Oct. 9, 1945 |

OTHER REFERENCES

Volnov et al.: Jour. Gen. Chem. (USSR), vol. 10, pp. 1600–1604 (1904), 8 pages.